(12) United States Patent
Ohta et al.

(10) Patent No.: US 7,743,413 B2
(45) Date of Patent: Jun. 22, 2010

(54) CLIENT APPARATUS, SERVER APPARATUS AND AUTHORITY CONTROL METHOD

(75) Inventors: Ken Ohta, Yokohama (JP); Takashi Suzuki, Yokosuka (JP); Hiroshi Inamura, Yokohama (JP); Atsushi Takeshita, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 996 days.

(21) Appl. No.: 11/210,831

(22) Filed: Aug. 25, 2005

(65) Prior Publication Data

US 2006/0048227 A1  Mar. 2, 2006

(30) Foreign Application Priority Data

Aug. 25, 2004  (JP) .......................... P2004-245794

(51) Int. Cl.
*G06F 12/14* (2006.01)
*G06F 12/16* (2006.01)
*G08B 23/00* (2006.01)

(52) U.S. Cl. .................. 726/22; 713/166; 713/187; 713/188; 726/24; 726/25; 726/26

(58) Field of Classification Search ............... None
See application file for complete search history.

(56) References Cited

U.S. PATENT DOCUMENTS

| | | | |
|---|---|---|---|
| 5,960,170 A * | 9/1999 | Chen et al. | 714/38 |
| 6,088,801 A * | 7/2000 | Grecsek | 726/1 |
| 6,701,440 B1 * | 3/2004 | Kim et al. | 726/24 |
| 7,043,757 B2 * | 5/2006 | Hoefelmeyer et al. | 726/24 |
| 2002/0116639 A1 | 8/2002 | Chefalas et al. | |
| 2004/0049693 A1 | 3/2004 | Douglas | |

FOREIGN PATENT DOCUMENTS

| | | |
|---|---|---|
| CN | 1431799 A | 7/2003 |
| JP | 09-218837 | 8/1997 |
| JP | 2003-5989 | 1/2003 |
| JP | 2003-256303 | 9/2003 |
| JP | 2003-296192 | 10/2003 |
| WO | WO 02/14987 A2 | 2/2002 |
| WO | WO 02/061510 A2 | 8/2002 |

OTHER PUBLICATIONS

David Wagner et al., " Intrusion Detection via Static Analysis", IEEE Symposium on Security and Privacy, 2001 13 Pages.

(Continued)

*Primary Examiner*—Kaveh Abrishamkar
(74) *Attorney, Agent, or Firm*—Oblon, Spivak, McClelland, Maier & Neustadt, L.L.P.

(57) ABSTRACT

A client apparatus to which data or a function is provided from a server apparatus, including: a monitoring unit configured to monitor monitoring target software, and detect an abnormal state or unauthorized state of the target software; a server management unit configured to manage an address of the server apparatus that is being accessed by the client apparatus; an abnormality information creation unit configured to create abnormality information from the abnormal state or the unauthorized state, which is detected by the monitoring unit; and an abnormality information notification unit configured to issue the abnormality information to the server apparatus managed by the server management unit.

13 Claims, 6 Drawing Sheets

OTHER PUBLICATIONS

"Change Auditing in a Layered Security Strategy: Providing the Essential Foundation for Data and Network Security", Tripwire White Paper, http://www.Tripwiresecurity.com, 13 Pages.

"AIDE: Advanced Intrusion Detection Environment", http://www.cs.tut.fi/~rammer/aide.html, Aug. 17, 2005, 3 Pages.

"Osiris User Handbook", Osiris, http://www.hostintegrity.com/osiris/handbook.html, Aug. 11, 2005, 20 Pages.

Toshiyuki Hyodo, "Security Status Rating", Computer Security Symposium 2002, Japan, Information Processing Society of Japan, Oct. 30, 2002, vol. 2002, pp. 71 to 76.

* cited by examiner

FIG. 2

| TYPE OF ABNORMALITY INFORMATION | SPOT | RISK | REMARKS |
|---|---|---|---|
| FILE MANIPULATION | DOCUMENT FILE | 1 | NOTEPAD AND THE LIKE |
| FILE MANIPULATION | APPLICATION SETTING FILE | 1 | SETTING OF BROWSER, AND THE LIKE |
| FILE MANIPULATION | SYSTEM FILE | 2 | NETWORK SETTING FILE, DAEMON, AND THE LIKE |
| COMMUNICATION ABNORMALITY | INCREASE OF COMMUNICATION TRAFFIC | 1 | TRANSMISSION OF LARGE AMOUNT OF MAIL, AND THE LIKE |
| COMMUNICATION ABNORMALITY | DETECTION OF UNAUTHORIZED PACKET | 2 | TRANSMISSION OF MAIL CONTAINING VIRUS, AND THE LIKE |
| COMMAND ABNORMALITY | USUAL COMMAND | 1 | DIRECTORY CREATION, FILE TRANSFER, AND THE LIKE |
| COMMAND ABNORMALITY | SIGNIFICANT COMMAND | 2 | ADDITION OF ACCOUNT, INSTALL OF SOFTWARE, AND THE LIKE |
| EXECUTION STRING ABNORMALITY | LOW CERTAINTY FACTOR | 1 | OPERATION IS INDISTINGUISHABLE WHETHER TO BE NORMAL OR ABNORMAL |
| EXECUTION STRING ABNORMALITY | HIGH CERTAINTY FACTOR | 2 | OPERATION IS OBVIOUSLY ABNORMAL |

FIG. 3

| RISK | ACCEPTED OPERATION | RESOURCE | REMARKS |
|---|---|---|---|
| RISK=0 | read,write | phonebook | ACCEPT READ/WRITE |
| RISK=1 | read | phonebook | PROHIBIT WRITE |
| RISK=2 | (deny) | phonebook | PROHIBIT READ/WRITE |
| RISK=0 | send,receive | network | ACCEPT TRANSMISSION/RECEPTION |
| RISK=1 | receive | network | PROHIBIT TRANSMISSION |
| RISK=2 | (deny) | network | PROHIBIT TRANSMISSION/RECEPTION |
| RISK=0 | connect | terminal | PERMIT CONNECTION |
| RISK=1,2 | (deny) | terminal | PROHIBIT CONNECTION |

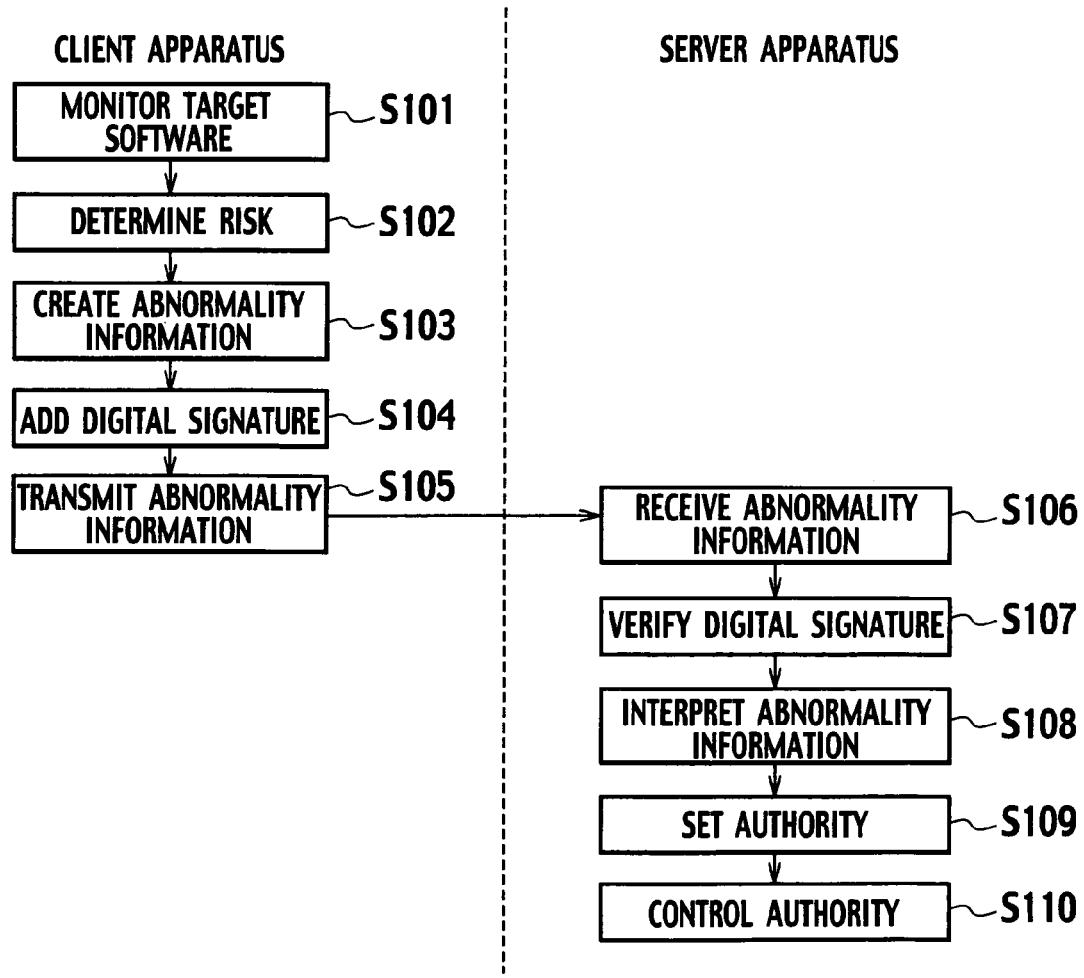

FIG. 4

CLIENT APPARATUS, SERVER APPARATUS AND AUTHORITY CONTROL METHOD

CROSS REFERENCE TO RELATED APPLICATIONS

This application is based upon and claims the benefit of priority from prior Japanese Patent Application No. P2004-245794, filed on Aug. 25, 2004; the entire contents of which are incorporated by reference herein.

BACKGROUND OF THE INVENTION

1. Field of the Invention

The present invention relates to a client apparatus, a server apparatus and an authority control method.

2. Description of the Related Art

An instrument (hereinafter, referred to as a "server apparatus") for providing resources of contents, a function and the like to another instrument has means for controlling an access authority of the other instrument (hereinafter, referred to as a "client apparatus") in order to protect the resources from an unauthorized access. Here, "the other instrument" includes, for example, instruments such as cellular phones, an information appliance, a PC, a PDA, and a workstation.

For example, based on an access control list (ACL), the server apparatus determines whether to accept or refuse a request for downloading the contents and a request for writing a file from a process on the client apparatus, and a request for reading and writing a local file of a mobile code sent from the client apparatus, thereby protecting the resources.

However, when the client apparatus allows attacker's and computer virus's intrusions, an authority of software is stolen and the software is manipulated, there are possibilities of an unauthorized use of the server apparatus and an outflow of the contents to the outside by the manipulated software.

As a countermeasure against the above, the following is possible. An unauthorized intrusion/manipulation detection system is introduced into the client apparatus to detect the unauthorized intrusion and the manipulation, thereby issuing abnormality information to preset administrator or server apparatus, cutting off a communication by using a firewall, recovering the client apparatus, and so on. The intrusion detection system monitors a command history, a log, and packets flowing through a network, and when discovering a command execution or a packet, which is regarded as an intrusion (unauthorized access), performs an action such as presenting an alarm, collecting a communication log, shielding the packet concerned by notifying the firewall of the intrusion, and recovering normal contents and a normal setting file. There is disclosed a technology for detecting an attack such as stealing an authority of a program under execution by monitoring an operation sequence of the program and monitoring whether the operation sequence conforms to a normal operation model of the program, which is constructed in advance (for example, refer to Wagner, Dean, "Intrusion Detection via Static Analysis," IEEE Symposium on Security and Privacy, 2001). Moreover, as an example of an unauthorized manipulation detection system, there is disclosed a technology for detecting the unauthorized manipulation by calculating a hash value of a system file, a log file or the like and comparing the hash value with a value at the time of a normal operation (for example, refer to Tripwire: http://www.tripwiresecurity.com; AIDE (Advanced Intrusion Detection Environment): http://www.cs.tut.fi/~rammer/aide.html; Osiris: http://www.shmoo.com/osiris/).

As described above, when detecting the abnormality information, the unauthorized intrusion/manipulation detection system on the conventional client apparatus has the means for making requests for limiting the authority, such as issuing the abnormality information to the designated destination and cutting off the communication, in accordance with a rule decided in advance by the setting file and the like.

However, while the client apparatus has a possibility to access an arbitrary server apparatus, the client apparatus does not have means for setting the server apparatus that is being accessed thereby as the destination of the notice and the request. Accordingly, there is a problem that protectable server apparatuses are limited. Moreover, since the server apparatus does not have means for interpreting the issued abnormality information and reflecting the abnormality information on the limitation of the authority, it is difficult to flexibly limit the authority in consideration of significance of the abnormality information of the client and property of the resources provided by the server apparatus, and there is a possibility to damage convenience of the client apparatus for a user.

For example, even in the case of a low-risk intrusion and a manipulation to a component having a low association with a critical part of system, the rule of the intrusion detection system may be set with putting priority on safety, and the server apparatus may make a request for limiting the authority so as to refuse every request from the client apparatus. Although being suitable for a critical server apparatus, this authority request becomes an excessive limitation for a tolerant server apparatus.

In consideration of the above-described problem, it is an object of the present invention to provide a client apparatus, a server apparatus and an authority control method, which make prevention of the unauthorized use of the server apparatus and the outflow of the contents and securement of the convenience for the user compatible with each other.

SUMMARY OF THE INVENTION

A first aspect of the present invention is to provide a client apparatus to which data or a function is provided from a server apparatus, including: (A) a monitoring unit configured to monitor monitoring target software, and detect an abnormal state or unauthorized state of the target software; (B) a server management unit configured to manage an address of the server apparatus that is being accessed by the client apparatus; (C) an abnormality information creation unit configured to create abnormality information from the abnormal state or the unauthorized state, which is detected by the monitoring unit; and (D) an abnormality information notification unit configured to issue the abnormality information to the server apparatus managed by the server management unit.

A second aspect of the present invention is to provide a server apparatus for providing data or a function to a client apparatus, including: (A) an abnormality information reception unit configured to receive abnormality information from the client apparatus; (B) an abnormality information interpretation unit configured to interpret the abnormality information; (C) a policy management unit configured to manage an authority setting rule for the interpreted abnormality information; (D) an authority setting unit configured to set an authority of the client apparatus according to the authority setting rule; and (E) an authority control unit configured to control the authority of the client apparatus according to the set authority.

A third aspect of the present invention is to provide an authority control method for controlling an authority of a client apparatus in a system including the client apparatus and a server apparatus for providing data or a function to the client apparatus, including: (A) monitoring monitoring target software; (B) creating abnormality information from an abnormal state or unauthorized state of the monitoring target software, which is detected by the step of monitoring the monitoring target software; (C) issuing the abnormality information to the server apparatus that is being accessed by the client apparatus; (D) interpreting the abnormality information received; (E) setting an authority of the client apparatus according to an authority setting rule for the interpreted abnormality information; and (F) controlling the access of the client apparatus according to the authority set.

BRIEF DESCRIPTION OF THE DRAWINGS

FIG. 2 is an example of a risk evaluation rule according to the first embodiment.

FIG. 3 is an example of the authority setting rule according to the first embodiment.

FIG. 4 is a flowchart showing an access control method according to the first embodiment.

DETAILED DESCRIPTION OF THE INVENTION

Figure 1:
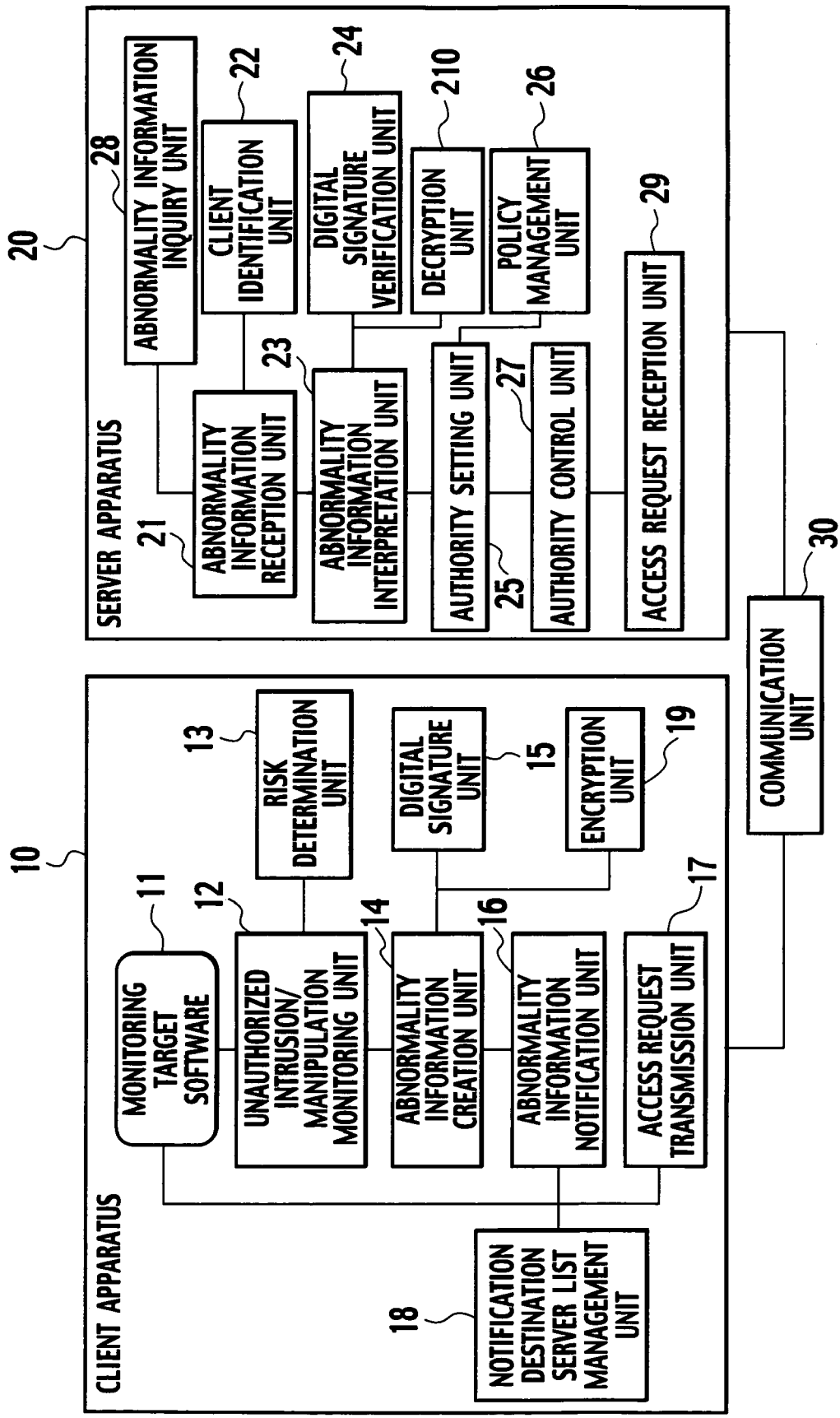
FIG. 1 is a configuration block diagram of a client apparatus and a server apparatus according to a first embodiment.

Various embodiments of the present invention will be described with reference to the accompanying drawings. It is to be noted that the same or similar reference numerals are applied to the same of similar parts and elements throughout the drawings, and the description of the same or similar parts and elements will be omitted or simplified.

First Embodiment

Authority Control System

As shown in FIG. 1, an authority control system according to a first embodiment includes a client apparatus 10, and a server apparatus 20 for providing data or a function to the client apparatus 10.

The client apparatus 10 and the server apparatus 20 are implemented in separate instruments or in the same instrument. While the client apparatus 10 and the server apparatus 20 are connected to each other by a communication unit, a connection mode thereof may be either a wired one or a wireless one, and any method such as a packet exchange, a line exchange, and serial/parallel communication may be used. In the first embodiment, it is assumed that the client apparatus 10 and the server apparatus 20 are implemented in the separate instruments, and are wirelessly connected to each other.

As shown in FIG. 1, the client apparatus 10 includes an access request transmission unit 17 for transmitting an access request to the server apparatus 20, an unauthorized intrusion/manipulation monitoring unit 12 for monitoring a monitoring target software 11 and a state and operation thereof, a risk determination unit 13 for calculating a risk of an intrusion or a manipulation, a notification destination server list management unit 18 for managing an address of a server apparatus being accessed, an abnormality information creation unit 14 for creating abnormality information from a detected abnormal state or unauthorized state, a digital signature unit 15 for adding a digital signature to the abnormality information, an encryption unit 19 for encrypting the abnormality information, and an abnormality information notification unit 16 for issuing the abnormality information.

The monitoring target software 11 is arbitrary software such as an application, middleware and an operating system on the client apparatus 10.

The unauthorized intrusion/manipulation monitoring unit 12 monitors a command execution string, a system file, a communication log, a system call execution log of the software, and inputted/outputted packets, and examines the existence of the unauthorized intrusion and the unauthorized manipulation.

The risk determination unit 13 calculates the risk in response to a type of the abnormal state or the unauthorized state, and specifically, in response to a type and spot of the intrusion or the manipulation. In the calculation of the risk, for example, a risk of virus information provided by an external institution (security organization and enterprise, and the like) or the like may be acquired and set as the risk.

The notification destination server list management unit 18 monitors an access of the client apparatus 10 to the server apparatus 20, and holds a list of an address of the server apparatus 20. The notification destination server list management unit 18 can hold a list of the server apparatus 20 that was accessed a certain time ago, and can hold a list of the server apparatus with which a session is established at present.

The abnormality information creation unit 14 creates the abnormality information from the detected abnormal state or unauthorized state. Here, the "abnormality information" contains at least any one of the type, risk, spot and certainty factor of the abnormal state or the unauthorized state. Moreover, when an authority of the client apparatus 10 is limited in an authority control unit 27 of the server apparatus 20, which will be describe later, the abnormality information creation unit 14 creates and issues abnormality information containing a type and spot of a recovery state of the client apparatus 10, thus making it possible to recover the authority of the client apparatus 10.

The digital signature unit 15 adds the digital signature to the abnormality information. Algorism of the digital signature may be arbitrary, such as RSA, EL Gamal, DSA and Rabin methods. Moreover, a certificate may be imparted by using a PKI (public key infrastructure).

The encryption unit 19 encrypts the abnormality information. A method of the encryption may be arbitrary, such as a secret key (shared key) encryption method, an SSL authentication method, and PGP.

The abnormality information notification unit 16 issues the abnormality information to the server apparatus 20 contained in the list held by the notification destination server list management unit 18 through the communication unit 30.

As shown in FIG. 1, the server apparatus 20 includes an access request reception unit 29 for receiving the access request from the client apparatus 10, an abnormality information reception unit 21 for receiving the abnormality information from the client apparatus 10, an abnormality information inquiry unit 28 for making an inquiry on the abnormality information to the client apparatus 10, a digital signature verification unit 24 for verifying the digital signature of the received abnormality information, a decryption unit 210 for decrypting the encrypted abnormality information, an abnormality information interpretation unit 23 for interpreting the abnormality information, a policy management unit 26 for managing an authority setting rule for the interpreted abnormality information, an authority setting unit 25 for setting the authority of the client apparatus according to the authority setting rule, the authority control unit 27 for limiting the authority of the client apparatus according to the authority setting, and a client identification unit 22 for limiting the authority to a client apparatus that does not have means for issuing the abnormality information.

The abnormality information reception unit 21 receives the abnormality information from the client apparatus 10 through the communication unit 30. Here, the "abnormality information" contains at least any one of the type, risk, spot and certainty factor of the abnormal state or the unauthorized state, and of the type of the recovery state and the spot of the recovery.

The abnormality information inquiry unit 28 makes the inquiry on the abnormality information to the client apparatus 10, and can not only wait for the reception of the abnormality information from the client apparatus 10 but also make a confirmation thereof from the server apparatus 20.

The digital signature verification unit 24 verifies the signature added to the abnormality information by using the public key of the client apparatus. When the certificate is imparted to the abnormality information, the signature is verified after the certificate is verified.

The decryption unit 210 decrypts the abnormality information when the abnormality information is encrypted.

The policy management unit 26 holds the authority setting rule for the contents and the function on the server apparatus 20 against the type of the abnormality state or the unauthorized state, and specifically, the type, spot, risk and certainty factor of the intrusion or the manipulation.

The abnormality information interpretation unit 23 interprets the abnormality information according to the authority setting rule held by the policy management unit 26, and determines the risk and the certainty factor based on the type and spot of the intrusion or the manipulation.

The authority setting unit 25 sets the authority of the client apparatus 10 according to the risk interpreted by the abnormality information interpretation unit 23 and the authority setting rule held by the policy management unit 26. For example, when the risk contained in the abnormality information is high, the authority is limited strictly, and when the risk is low, the limitation on the authority is loosened.

The authority control unit 27 limits the authority of the client apparatus 10 according to the authority set by the authority setting unit 25.

Moreover, when the type of the recovery state and the spot of the recovery are contained in the abnormality information, the authority of the client apparatus 10 is recovered by an authority recovery unit (not shown) of the server apparatus 20.

FIG. 2 and FIG. 3 show an example of the authority setting rule held by the policy management unit 26.

FIG. 2 shows a setting rule for determining the risk in response to the type and spot of the abnormality information. With regard to file manipulation, risks are set in ascending order from a document file, an application setting file, and a system file. With regard to communication abnormality, risks are set at 1 and 2 for an increase of communication traffic and a detection of an unauthorized packet, respectively. Moreover, with regard to command abnormality, risks are set at 1 and 2 for a usual command and a significant command, respectively. Furthermore, with regard to abnormality of the execution string of the system call or the like, a risk of 1 is set for the case where it cannot be distinguished whether the operation is normal or abnormal and the certainty factor is low, and a risk of 2 is set for the case where it is obvious that the operation is abnormal.

FIG. 3 shows an example of the setting rule for determining the operation permitted to the resource in response to the risk. Here, a cellular phone is assumed as the server apparatus 20, and a laptop PC is assumed as the client apparatus 10. The resources on the server apparatus 20 (cellular phone) include a telephone directory, a network access, and a virtual terminal, in each of which a setting is made as to whether to accept or refuse reading/writing, transmission/reception and connection in response to the risk. Specifically, when the risk is 2, authority requests that the client apparatus 10 read the telephone directory on the server apparatus 20 and write data to the telephone directory are refused. Moreover, authority requests that a process on the client apparatus 10 (laptop PC) transmit data to the outside by using a wireless communication of the server apparatus 20 (cellular phone) and receive data from the outside are also refused. Furthermore, it is also refused to connect the virtual terminal of the client apparatus 10 to the server apparatus 20. In such a way, the resources on the server apparatus 20 are protected. Meanwhile, when the risk is 1, it is accepted to read the telephone directory by the client and to receive data from the server apparatus, and the convenience for the user is ensured.

Moreover, in the above-described client apparatus 10 and server apparatus 20, description has been made of the limitation on the authority in the server apparatus 20; however, the authority may be limited in the client apparatus 10. For example, in the case of having detected that the setting file is broken or infected with a virus, the unauthorized intrusion/manipulation monitoring unit 12 can refuse an activation of an application relating thereto. Moreover, in the case of having detected an abnormality of a module relating to the communication, the unauthorized intrusion/manipulation monitoring unit 12 can halt a function of the communication of the client apparatus 10. In this case, the client apparatus 10 includes the above-described policy management unit 26, and the policy management unit 26 has the authority setting rule for the resources on the client apparatus 10 against the type and risk of the abnormality information, thus making it possible to limit the authority of the client apparatus 10 in the client apparatus 10.

Moreover, each of the client apparatus 10 and the server apparatus 20 according to the first embodiment can be configured to include a central processing unit (CPU), and to build, as modules in the CPU, the above-described unauthorized intrusion/manipulation monitoring unit 12, risk determination unit 13, abnormality information creation unit 14, digital signature unit 15, abnormality information notification unit 16, access request transmission unit 17, notification destination server list management unit 18, abnormality information reception unit 21, client identification unit 22, abnormality information interpretation unit 23, digital signature verification unit 24, authority setting unit 25, policy management unit 26, authority control unit 27, abnormality information inquiry unit 28, access request reception unit 29, and the like. These modules can be realized by executing dedicated programs for utilizing a predetermined program language in a general-purpose computer such as a personal computer.

Furthermore, though not shown, each of the client apparatus 10 and the server apparatus 20 may include a program holding unit for storing a program for allowing the central processing unit (CPU) to execute unauthorized intrusion/manipulation monitoring processing, risk determination processing, abnormality information creation processing, abnormality information reception processing, abnormality information interpretation processing, authority control processing, and the like. The program holding unit is, for example, a recording medium such as a RAM, a ROM, a hard disk, a flexible disk, a compact disc, an IC chip, and a cassette tape. According to the recording medium as described above, storage, carriage, sale and the like of the program can be performed easily.

(Authority Control Method)

Next, an authority control method according to the first embodiment will be described by using FIG. 4.

First, in Step S101, the unauthorized intrusion/manipulation monitoring unit 12 of the client apparatus 10 monitors the command execution string, the system file, the communication log, the system call execution string of the software, and the inputted/outputted packets, and examines the existence of the unauthorized intrusion and the unauthorized manipulation.

Next, in Step S102, the risk determination unit 13 calculates the risk in response to the type and spot of the intrusion or the manipulation.

Next, in Step S103, the abnormality information creation unit 14 creates the abnormality information from the detected abnormal state or unauthorized state.

Next, in Step S104, the digital signature unit 15 adds the digital signature to the abnormality information.

Next, in Step S105, the abnormality information notification unit 16 transmits the abnormality information through the communication unit 30 to the server apparatus 20 contained in the list held by the notification destination server list management unit 18.

Next, in Step S106, the abnormality information reception unit 21 of the server apparatus 20 receives the abnormality information through the communication unit 30 from the client apparatus 10.

Next, in Step S107, the digital signature verification unit 24 verifies the signature added to the abnormality information by using the public key of the client apparatus. When the certificate is imparted to the abnormality information, the signature is verified after the certificate is verified.

Next, in Step S108, the abnormality information interpretation unit 23 interprets the abnormality information according to the authority setting rule held by the policy management unit 26, and determines the risk, the certainty factor and the like based on the type and spot of the intrusion or the manipulation.

Next, in Step S109, the authority setting unit 25 sets the authority of the client apparatus 10 according to the risk interpreted by the abnormality information interpretation unit 23 and the authority setting rule held by the policy management unit 26.

Next, in Step S110, the authority control unit 27 limits the authority of the client apparatus 10 according to the authority set by the authority setting unit 25.

Thereafter, in the case where the server apparatus 20 has received the abnormality information containing the type of the recovery state and the spot of the recovery from the client apparatus 10, the authority of the client apparatus 10 is recovered by the authority recovery unit (not shown) of the server apparatus 20. In such a way, the authority of the client apparatus 10 can be reset.

(Function and Effect)

In accordance with the client apparatus 10 according to the first embodiment, it is possible to monitor the unauthorized intrusion or manipulation made thereto, to manage the server apparatus 20 that is being accessed thereby, and in the case of the abnormality detection, to issue the abnormality information to the server apparatus that is being accessed thereby. Therefore, it is possible to make prevention of the unauthorized use of the server apparatus 20 and the outflow of the contents and securement of the convenience for the user compatible with each other.

Moreover, the client apparatus 10 includes the risk determination unit 13 for calculating the risk of the abnormal state or the unauthorized state. Accordingly, the server apparatus can limit the authority strictly when the risk is high, and can loosen the authority when the risk is low, thus making it possible to make protection of the resources and the securement of the convenience for the user compatible with each other.

Furthermore, the abnormality information contains at least any one of the type, risk, spot and certainty factor of the abnormal state or the unauthorized state. According to the client apparatus 10 as described above, the server apparatus can set the authority in detail based on the type and spot of the intrusion or the manipulation. For example, the server apparatus can limit only an access request relating to the type and spot of the intrusion or the manipulation, thus making it possible to make the protection and the convenience compatible with each other. Moreover, when the certainty factor is low, it is also possible to loosen the limitation on the authority.

Still further, the client apparatus 10 includes the digital signature unit 15 for adding the digital signature to the abnormality information or the encryption unit 19 for encrypting the abnormality information. Accordingly, the server apparatus 20 can verify to have received the abnormality information from the authorized client apparatus 10, and can prevent the abnormality information from being peeped on the way by means of the encryption.

In accordance with the server apparatus 20 according to the first embodiment, the abnormality information can be received and interpreted, and the access authority of the client apparatus can be limited appropriately according to the authority control rule. Therefore, it is possible to make the prevention of the unauthorized use of the server apparatus and the outflow of the contents and the securement of the convenience for the user compatible with each other.

Moreover, the server apparatus 20 includes the abnormality information inquiry unit 28 for making the inquiry on the abnormality information to the client apparatus. Accordingly, the server apparatus 20 can confirm the state of the client apparatus at desired timing, and can protect the resources more flexibly and safely.

Furthermore, the server apparatus 20 includes the digital signature verification unit 24 for verifying the digital signature of the abnormality information or the decryption unit 210 for decrypting the encrypted abnormality information. Accordingly, the server apparatus 20 can verify to have received the authorized abnormality information from the authorized client apparatus, and can prevent the abnormality information from being peeped on the way by means of the encryption.

Still further, the server apparatus 20 includes the client identification unit 22 for limiting the authority to the client apparatus that does not have the means for issuing the abnormality information. Accordingly, the server apparatus 20 can protect the resources from the client apparatus that does not have capabilities of detecting and issuing the abnormality information.

Second Embodiment

Authority Control System

Figure 5:
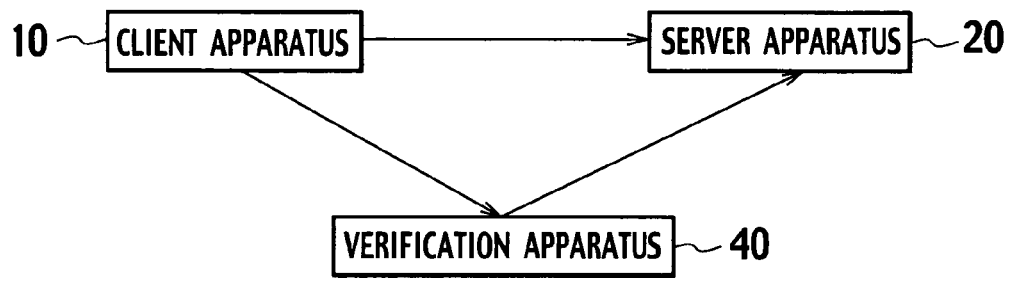
FIG. 5 is a schematic view explaining an authority control system according to a second embodiment.

As shown in FIG. 5, an authority control system according to the second embodiment includes a verification apparatus 40 for performing the interpretation of the abnormality information, the determination of the risk, and the authority setting based on the authority rule in place of the server apparatus 20 in addition to the client apparatus 10 and the server apparatus 20. The verification apparatus 40 performs these pieces of processing in place of the server apparatus 20, thus making it possible to reduce functions of the server apparatus 20 and a load thereon, and to reduce a load of an administrator of the server apparatus on setting the authority rule.

The client apparatus 10 is similar to that of the first embodiment except that it transmits the abnormality information not to the server apparatus 20 but to the verification apparatus 40, and accordingly, description thereof will be omitted here.

Figure 6:
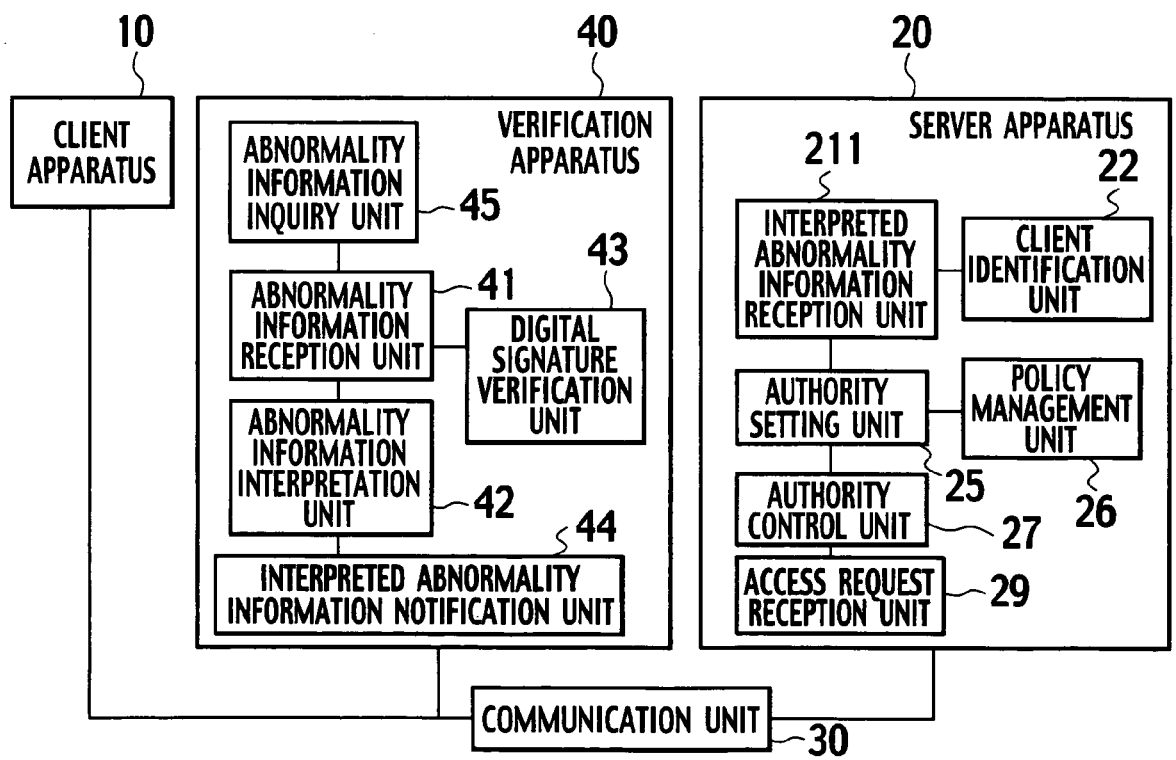
FIG. 6 is a configuration block diagram of a client apparatus, a server apparatus and a verification apparatus according to the second embodiment.

As shown in FIG. 6, the verification apparatus 40 includes an abnormality information reception unit 41 for receiving the abnormality information from the client apparatus 10, an abnormality information inquiry unit 45 for making an inquiry on the abnormality information to the client apparatus 10, a digital signature verification unit 43 for verifying the digital signature of the received abnormality information, an abnormality information interpretation unit 42 for interpreting the abnormality information, and an interpreted abnormality information notification unit 44 for issuing the interpreted abnormality information.

The abnormality information reception unit 41, the abnormality information inquiry unit 45, the digital signature verification unit 43, and the abnormality information interpretation unit 42 have similar functions to those of the abnormality information reception unit 21, the abnormality information inquiry unit 28, the digital signature verification unit 24, and the abnormality information interpretation unit 23 in the first embodiment, and accordingly, description thereof will be omitted here.

The interpreted abnormality information notification unit 44 issues the interpreted abnormality information to the server apparatus 20.

As shown in FIG. 6, the server apparatus 20 includes the access request reception unit 29 for receiving the access request from the client apparatus 10, an interpreted abnormality information reception unit 211 for receiving the interpreted abnormality information, the policy management unit 26 for managing the authority setting rule for the interpreted abnormality information, the authority setting unit 25 for setting the authority of the client apparatus 10 according to the authority setting rule, and the authority control unit 27 for limiting the authority of the client apparatus according to the authority setting.

The interpreted abnormality information reception unit 211 receives the interpreted abnormality information from the verification apparatus 40.

The access request reception unit 29, the policy management unit 26, the authority setting unit 25, the authority control unit 27 are similar to those of the first embodiment, and accordingly, description thereof will be omitted here.

(Authority Control Method)

Figure 7:
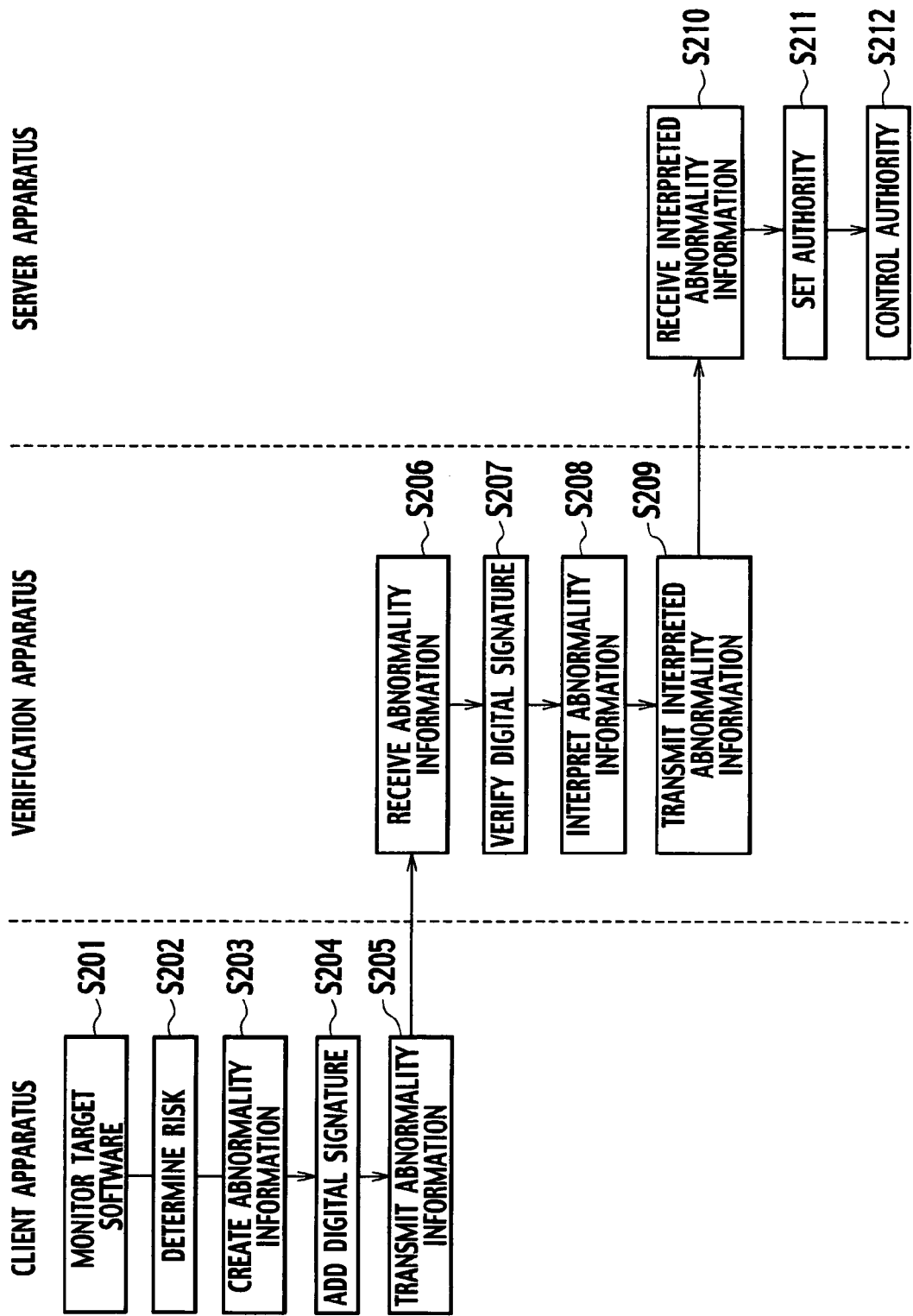
FIG. 7 is a flowchart showing an authority control method according to the second embodiment.

An authority control method according to the second embodiment will be described by using FIG. 7.

First, in Step S201, the unauthorized intrusion/manipulation monitoring unit 12 of the client apparatus 10 monitors the command execution string, the system file, the communication log, the system call execution string of the software, and the inputted/outputted packets, and examines the existence of the unauthorized intrusion and the unauthorized manipulation.

Next, in Step S202, the risk determination unit 13 calculates the risk in response to the type and spot of the intrusion or the manipulation.

Next, in Step S203, the abnormality information creation unit 14 creates the abnormality information from the detected abnormal state or unauthorized state.

Next, in Step S204, the digital signature unit 15 adds the digital signature to the abnormality information.

Next, in Step S205, the abnormality information notification unit 16 transmits the abnormality information through the communication unit 30 to the verification apparatus 40.

Next, in Step S206, the abnormality information reception unit 41 of the verification apparatus 40 receives the abnormality information through the communication unit 30 from the client apparatus 10.

Next, in Step S207, the digital signature verification unit 43 verifies the signature added to the abnormality information by using the public key of the client apparatus. When the certificate is imparted to the abnormality information, the signature is verified after the certificate is verified.

Next, in Step S208, the abnormality information interpretation unit 42 interprets the abnormality information, and determines the risk, the certainty factor and the like based on the type and spot of the intrusion or the manipulation.

Next, in Step S209, the interpreted abnormality information notification unit 44 transmits the interpreted abnormality information through the communication unit 30 to the server apparatus 20.

Next, in Step S210, the interpreted abnormality information reception unit 211 of the server apparatus 20 receives the interpreted abnormality information from the verification apparatus 40.

Next, in Step S211, the authority setting unit 25 sets the authority of the client apparatus 10 according to the risk interpreted by the abnormality information interpretation unit 42 and the authority setting rule held by the policy management unit 26.

Next, in Step S212, the authority control unit 27 limits the authority of the client apparatus 10 according to the authority set by the authority setting unit 25.

Thereafter, in the case where the server apparatus 20 has received the abnormality information containing the type of the recovery state and the spot of the recovery from the client apparatus 10, the authority of the client apparatus 10 is recovered by the authority recovery unit (not shown) of the server apparatus 20. In such a way, the authority of the client apparatus 10 can be reset.

(Function and Effect)

In accordance with the authority control system according to the second embodiment, the verification apparatus 40 can be provided separately from the client apparatus 10 and the server apparatus 20. By such function sharing, the verification apparatus 40 can be intensively given algorism and a database for interpreting a variety of the abnormality information, and development and operation cost of the server apparatus 20 can be reduced.

Third Embodiment

Authority Control System

Figure 8:
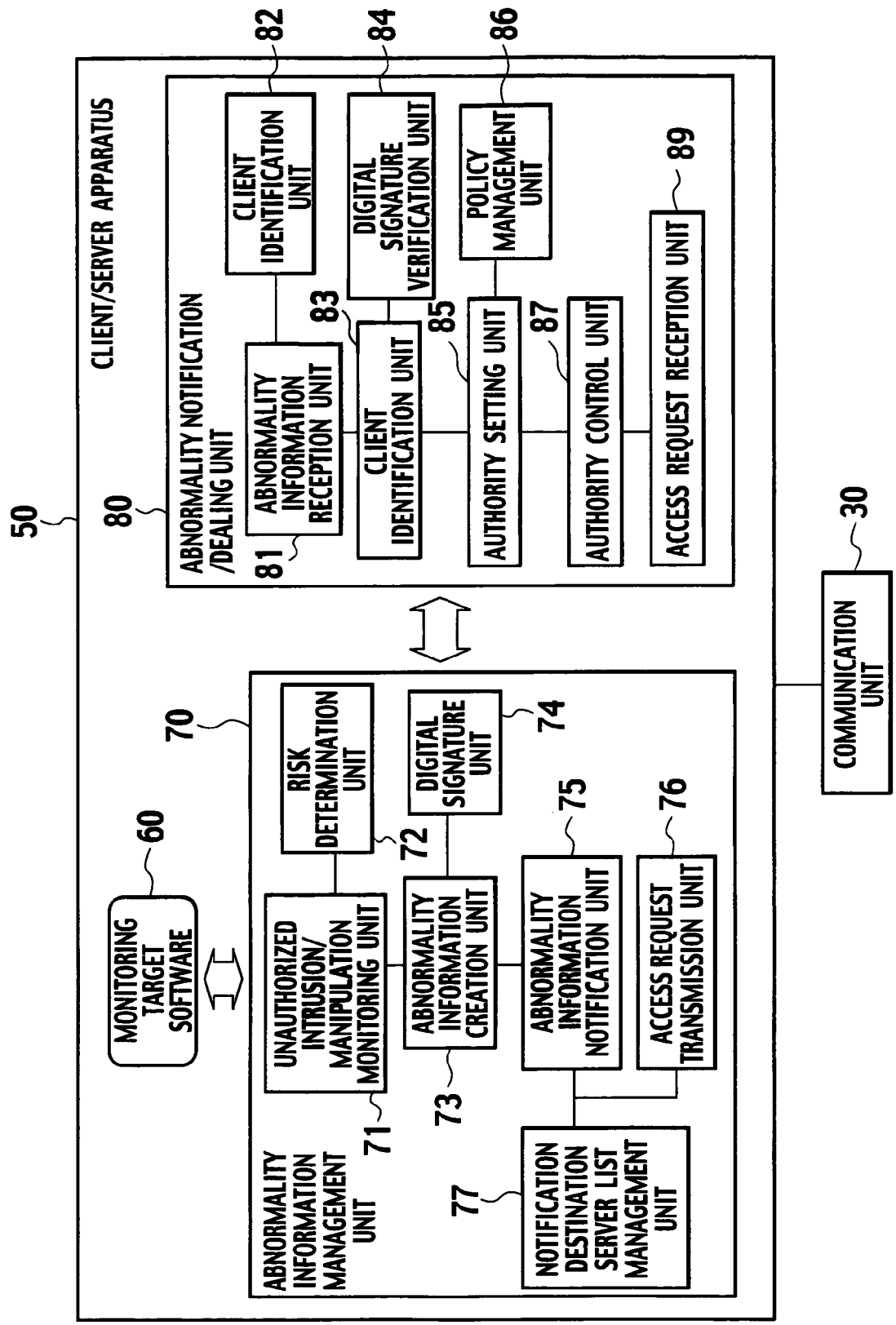
FIG. 8 is a configuration block diagram of client/server apparatuses according to a third embodiment.

As shown in FIG. 8, an authority control system according to a third embodiment does not include functional categories such as utilizing the resources and providing the resources, which are the client apparatus 10 and the server apparatus 20, but includes a client/server apparatus 50 in such a peer-to-peer environment as mutually utilizing the resources.

The client/server apparatus 50 includes an abnormality information management unit 70 for monitoring monitoring target software 60 and creating the abnormality information, and an abnormality notification/dealing unit 80 for controlling the authority based on the abnormality information.

An access request transmission unit 76, unauthorized intrusion/manipulation monitoring unit 71, risk determination unit 72, notification destination server list management unit 77, abnormality information creation unit 73, digital signature unit 74 and abnormality information notification unit 75 of the abnormality information management unit 70 are similar to the access request transmission unit 17, unauthorized intrusion/manipulation monitoring unit 12, risk determination unit 13, notification destination server list management unit 18, abnormality information creation unit 14, digital signature unit 15 and abnormality information notification unit 16 of the client apparatus 10 in the first embodiment, respectively, and accordingly, description thereof will be omitted here.

Moreover, an access request reception unit 89, abnormality information reception unit 81, digital signature verification unit 84, abnormality information interpretation unit 83, policy management unit 86, authority setting unit 85, authority control unit 87 and client identification unit 82 of the abnormality notification/dealing unit 80 are similar to the access request reception unit 29, abnormality information reception unit 21, digital signature verification unit 24, abnormality information interpretation unit 23, policy management unit 26, authority setting unit 25, authority control unit 27 and client identification unit 22 of the server apparatus 20 according to the first embodiment, respectively, and accordingly, description thereof will be omitted here.

(Authority Control Method)

An authority control method according to the third embodiment is similar to the authority control method (FIG. 4) according to the first embodiment, and accordingly, description thereof will be omitted here.

(Function and Effect)

In accordance with the client/server apparatus according to the third embodiment, the same function is given to both of the client apparatus 10 and the server apparatus 20, which have been described in the first embodiment, thus making it possible to confirm that there is nothing wrong with either thereof, and to utilize the resources safely.

Other Embodiments

Although the present invention has been described by means of the above-described embodiments, it should not be understood that the statements and the drawings, which partially form the disclosure, limit the present invention. From the disclosure, various alternative embodiments, examples, and application technologies will be obvious to those skilled in the art.

For example, the authority control system according to the third embodiment can adopt a configuration to introduce the verification apparatus 40 described in the second embodiment thereinto. In this case, as shown in FIG. 6, the functions can be shared by the client/server apparatus 50 and the verification apparatus 40, and accordingly, cost reduction can be achieved.

Moreover, in the first to third embodiments, though description has been made that the abnormality information is issued while containing the type of the recovery state and the spot of the recovery in order to recover the authority of the client apparatus 10, the client apparatus 10 may further include a recovery information creation unit for only creating recovery information separately from the abnormality information, and a recovery information notification unit for issuing the recovery information. In a similar way, the server apparatus 20 may further include a recovery information reception unit for receiving the recovery information, and a recovery information interpretation unit for interpreting the recovery information.

Various modifications will become possible for those skilled in the art after receiving the teachings of the present disclosure without departing from the scope thereof.

What is claimed is:

1. A client apparatus to which data or a function is provided from a server apparatus, comprising:
   a monitoring unit configured to monitor target software, and detect an abnormal state or unauthorized state of the target software;
   a server management unit configured to manage an address of the server apparatus that is being accessed by the client apparatus;
   an abnormality information creation unit configured to create abnormality information from the abnormal state or the unauthorized state, which is detected by the monitoring unit, the abnormality information including the abnormal state detected and a location where the abnormal state occurs; and
   an abnormality information notification unit configured to issue the abnormality information to the server apparatus managed by the server management unit,
   wherein a first table associating abnormal states, locations where abnormal states occur and risks is used to determine a risk corresponding to the abnormal state detected, a second table associating risks, server resources and permitted operations is used to determine a permitted operation for the client apparatus based on the determined risk, and an authority of the client apparatus is set in accordance with the determined permitted operation.

2. The client apparatus according to claim 1, further comprising a risk determination unit configured to calculate a risk of the abnormal state or the unauthorized state.

3. The client apparatus according to claim 1, wherein the abnormality information contains at least any one of a type, risk, spot and certainty factor of the abnormal state or the unauthorized state, a type of a recovery state, and a spot of a recovery.

4. The client apparatus according to claim 1, further comprising a digital signature unit configured to add a digital signature to the abnormality information or an encryption unit configured to encrypt the abnormality information.

5. The client apparatus according to claim 1, wherein the second table is configured to decrease a number of permitted operations in accordance with an increase in the risk.

6. A server apparatus for providing data or a function to a client apparatus, comprising:
- an abnormality information reception unit configured to receive abnormality information from the client apparatus, the abnormality information including an abnormal state detected in the client apparatus and a location where the abnormal state occurs;
- an abnormality information interpretation unit configured to determine a risk of the abnormal state in accordance with a first table associating abnormal states, locations where the abnormal states occur and risks;
- a policy management unit configured to determine a permitted operation in accordance with a second table associating risks, server resources and permitted operations;
- an authority setting unit configured to set an authority of the client apparatus according to the permitted operations determined by the policy management unit; and
- an authority control unit configured to control the authority of the client apparatus according to the set authority.

7. The server apparatus according to claim 6, further comprising an abnormality information inquiry unit configured to make an inquiry on the abnormality information to the client apparatus.

8. The server apparatus according to claim 6, wherein the abnormality information contains at least any one of a type, risk, spot and certainty factor of an abnormal state or an unauthorized state, a type of a recovery state, and a spot of a recovery.

9. The server apparatus according to claim 6, further comprising a digital signature verification unit configured to verify a digital signature of the abnormality information or a decryption unit configured to decrypt the abnormality information encrypted.

10. The server apparatus according to claim 6, further comprising a client identification unit configured to limit the authority of the client apparatus that does not have means for issuing the abnormality information.

11. The server apparatus according to claim 6, wherein the second table is configured to decrease a number of permitted operations in accordance with an increase in the risk.

12. An authority control method for controlling an authority of a client apparatus in a system including the client apparatus and a server apparatus for providing data or a function to the client apparatus, comprising:
- monitoring target software;
- creating abnormality information from an abnormal state or unauthorized state of the target software, which is detected by the step of monitoring target software, the abnormality information including an abnormal state;
- issuing the abnormality information to the server apparatus that is being accessed by the client apparatus;
- determining, in the server apparatus, a risk of the abnormal state in accordance with a first table associating abnormal states, locations where the abnormal states occur and risks;
- determine, in the server apparatus, a permitted operation in accordance with a second table associating risks, server resources and permitted operations;
- setting, in the server apparatus, an authority of the client apparatus according to the determined permitted operations; and
- controlling the access of the client apparatus according to the authority set.

13. The authority control method according to claim 12, wherein the second table is configured to decrease a number of permitted operations in accordance with an increase in the risk.

* * * * *